United States Patent [19]

Berresheim

[11] Patent Number: 4,978,956
[45] Date of Patent: Dec. 18, 1990

[54] APPARATUS FOR DIGITAL CONVERSION AND PROCESSING OF ANALOG INERTIAL VELOCITY OR ACCELERATION SIGNALS

[75] Inventor: Alexander Berresheim, Brunnthal, Fed. Rep. of Germany

[73] Assignee: Messerschmitt-Bölkow-Blohm GmbH, Munich, Fed. Rep. of Germany

[21] Appl. No.: 306,403

[22] Filed: Feb. 3, 1989

[30] Foreign Application Priority Data

Feb. 9, 1988 [DE] Fed. Rep. of Germany ....... 3803872

[51] Int. Cl.$^5$ ............................................. H03M 1/12
[52] U.S. Cl. .................................... 341/155; 341/158
[58] Field of Search ................. 341/155, 158, 53, 139, 341/166, 158, 200

[56] References Cited

U.S. PATENT DOCUMENTS

| 4,254,406 | 3/1981 | Meares | 341/158 |
| 4,517,550 | 5/1985 | Nakamura et al. | 341/158 |
| 4,683,456 | 7/1987 | Nelson | 341/166 |

OTHER PUBLICATIONS

Analog-Digital Conversion Handbook, 1986, pp. 639-642, "Digital Signal Processing Hardware".

Primary Examiner—William M. Shoop, Jr.
Assistant Examiner—Helen Kim
Attorney, Agent, or Firm—Kenyon & Kenyon

[57] ABSTRACT

A circuit for converting analog velocity and acceleration signals into digital signals for further digital processing is disclosed. An integration stage using the register accumulation process replaces the charging capacitor used on analog systems and is much more accurate.

5 Claims, 4 Drawing Sheets

APPARATUS FOR DIGITAL CONVERSION AND PROCESSING OF ANALOG INERTIAL VELOCITY OR ACCELERATION SIGNALS

FIELD OF THE INVENTION

The present invention relates to the field of analog to digital signal conversion and processing. More specifically, it relates to converting analog signals derived from inertial velocity or acceleration sensors to digital signals and processing the resultant digital signals.

BACKGROUND OF THE INVENTION

Inertial systems for measuring velocity or acceleration generally use gyroscopes as the seismic mass. Useful analog signals require both an angle measurement and the integration of the measuring signals. Sensors and inertial measuring system used in anti-blocking systems and anti-slippage systems, which may use inductive or photoelectric sensors, operate on the same principles.

Analog circuits are usually used for the signal preparation and integration. In these circuits a capacitor is charged, the charging voltage being proportional to the integral of the charging current. This method has various shortcomings such as variations in the tolerance of the charging current, and drift and offset in the necessary amplifiers and capacitors which may affect the accuracy of the integration. Systems using this apparatus to process small signals consequently have limited resolution.

It is an object of this invention to eliminate the possible sources of error which occur during analog signal processing of inertial measuring signals.

SUMMARY OF THE INVENTION

These objects and others are fulfilled in the present invention by a circuit wherein the analog signal is converted into a 12 bit digital word, with sampling occurring over a short time interval. The resulting digital word is integrated over the same short time period in an integrator stage comprised of a multiplication means and summing means. In the first iteration, the digital word is multiplied by a constant. This product is, on the second iteration, added to the product of the second multiplication, the process continuing repeatedly over the integration period.

This signal processing results in a signal of high accuracy, high null stability, high linearity, high long-term stability and high resolution. Further, as the digital processing is software controlled, changes and modification can be made simply, without altering the hardware.

It is important to note that when used with inertial sensors, the A/D conversion occurs near the beginning of the signal processing, which eliminates many of the errors which creep into the analog processing of these signals.

The present invention also avoids the high computing costs related to the processing equipment and other requisite peripheral equipment used in analog processing by direct parallel processing of the signals.

These and other objects and advantages of the invention will appear more clearly from the following specification in connection with the accompanying drawings, in which:

DETAILED DESCRIPTION

Figure 1:
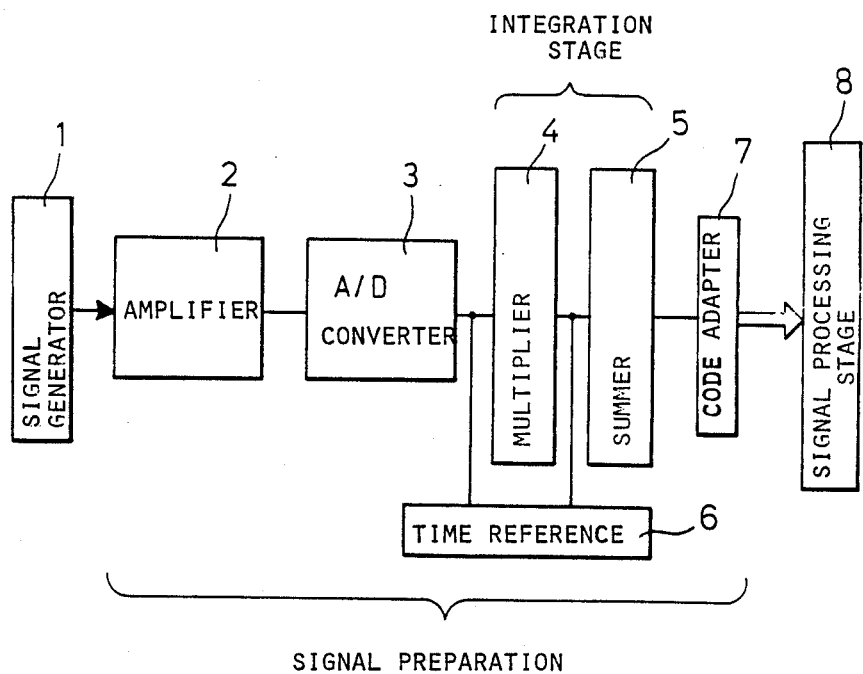
FIG. 1 shows a condensed block diagram of the present invention.

Referring to FIG. 1, the incoming analog velocity 'v' or acceleration 'g' signals, detected by various sensors, are applied to signal input unit 1. Input unit 1 produces a signal proportional to the velocity or acceleration, for example, a force signal proportional to the acceleration according to the formula F=M*A. Coupled to input unit 1 is an operational amplifier 2 and A/D converter 3. After passing through amplifier 2 and A/D converter 3, the signals are applied to a multiplier 4 and a summing means 5 together forming the integration stage. In multiplier 4 and summing means 5, factors X (the digital signal) and Y (a constant) are processed to form a product P. The result P of a multiplication is added to the result P of a subsequent multiplication in a process known as register accumulation. The formula describing this accumulation is:

$$P(t_0) = X(t_0) * Y(t_0) + 0$$
$$P(t_1) = X(t_1) * Y(t_1) + P(t_0)$$
$$P(t_2) = X(t_2) * Y(t_2) + P(t_1)$$
$$\overline{\phantom{xx}} \quad \overline{\phantom{xx}} \quad \overline{\phantom{xx}} \quad \overline{\phantom{xx}}$$
$$P(t_n) = X(t_n) * Y(t_n) + P(t_{n-1})$$

In the formula, t is the time, measured in discrete periods of equal length. If Y is chosen to be equal to a constant, e.g. Y=1, then P forms a time dependent sum of X. The processed signal is then applied to a code matching element 7 from whence it is transmitted to further signal processing/applications stages 8.

Figure 2:
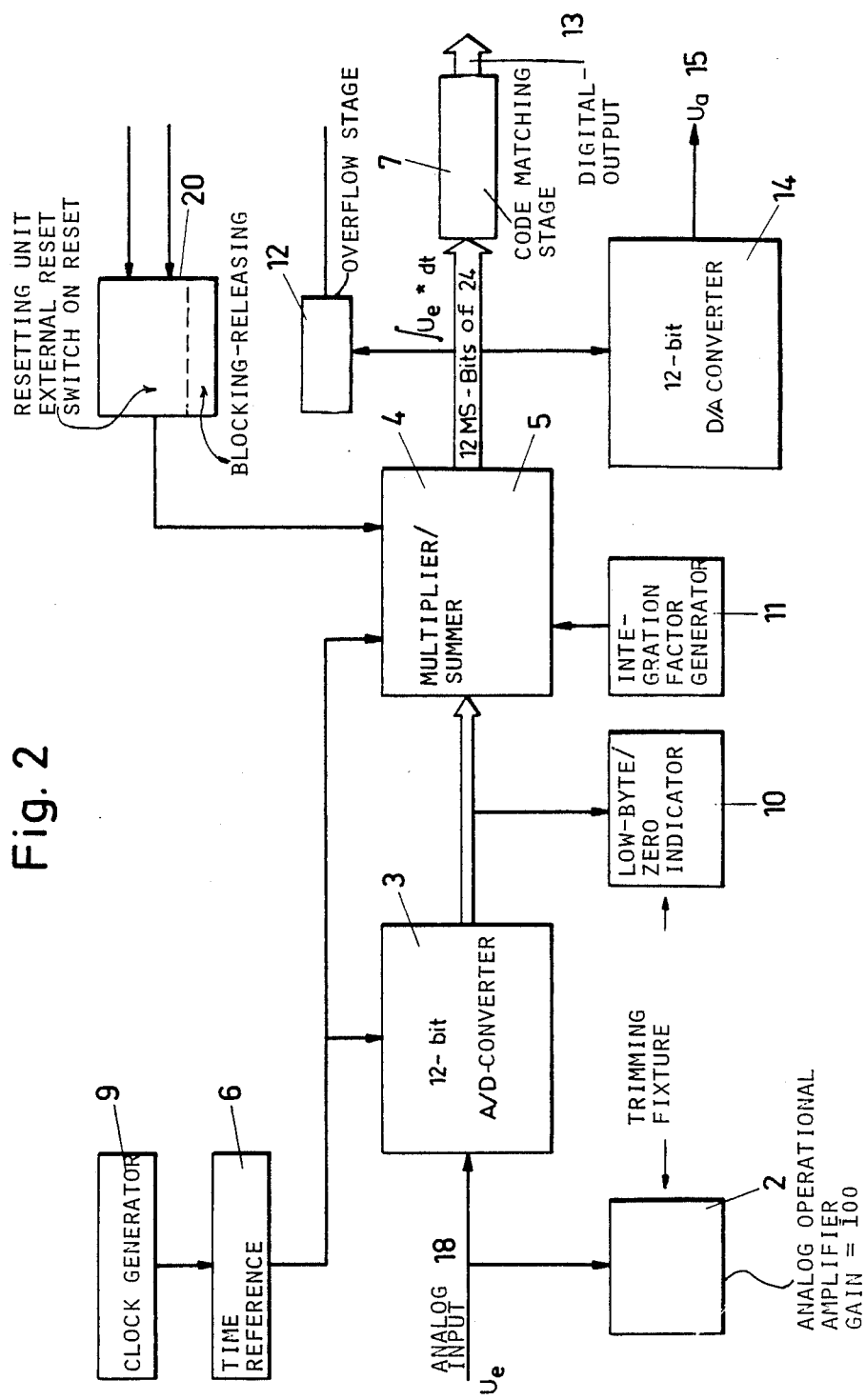
FIG. 2 shows a block diagram of the present invention from analog signal input to digital signal output.

Referring to FIG. 2, wherein like components are numbered the same as in FIG. 1, clock generator 9 applies its time pulses to time reference generator 6. An analog signal of input voltage $U_e$ is applied to analog operational amplifier 2, which has a gain of 100. Operational amplifier 2 is coupled to A/D converter 3, which outputs digital numbers 12 bits wide. Zero-set indicator 10, also called a low byte zero setter, is also coupled to A/D converter 3. Operational amplifier 2 and zero-set indicator 10 act as a trimming fixture for A/D converter 3.

Figure 6:
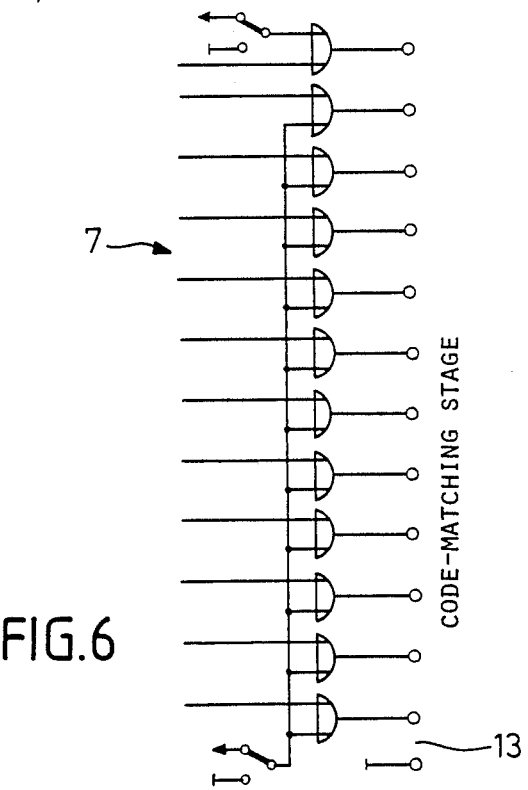
FIG. 6 shows a code matching circuit used in the present invention.

A/D converter 3 is in turn coupled to multiplier 4/summing means 5. Integration factor generator 11 can also be coupled to multiplier 4/summing means 5. Depending on the application, a sign inverter (not shown) can also be coupled to multiplier 4/summing means 5. An overflow in multiplier 4/summing means 5 is indicated by overflow indicator 12, coupled thereto. Resetting unit 20 is also coupled to multiplier 4/summing means 5. Resetting unit 20 resets the apparatus to an "ON" condition and also serves as a switch to apply the output of multiplier 4/summing means 5 to either the analog output through D/A converter 14 or digital processing unit 8 by way of code matching means 7 (see FIG. 6).

The output of multiplier 4/summing means 5, comprising only 12 bits of the 24 bits generated by multiplier 4/summing means 5, the rest being suppressed as too small or not required, is fed to code matching means 7 for code matching. This is only necessary if further digital signal processing is to occur in stage 8.

If the final output must be in analog form, the output from multiplier 4/summing means 5 is applied to D/A converter 14, which generates an analog output signal of voltage $V_a$.

For the sake of simplicity, no power supply has been depicted. Such supplies are known in the art and do not need to be drawn or discussed, as any appropriate conventional power supply will be usable in this apparatus.

Figure 3:
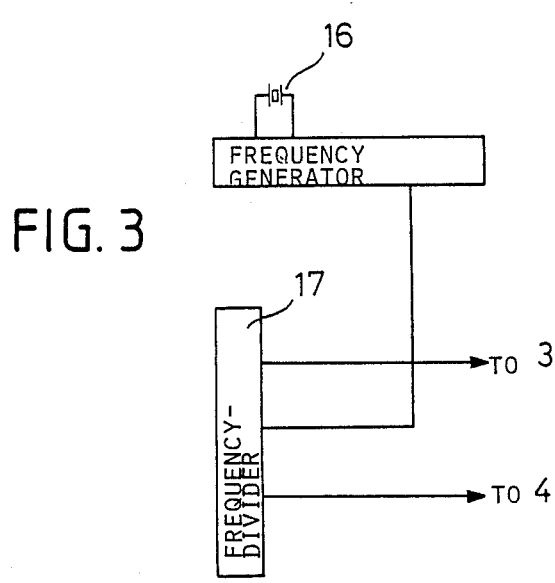
FIG. 3 shows a block diagram of how the clock signal of the present invention is generated.

FIG. 3 shows a detail of how the time reference means 6 provides its time reference signal. Quartz oscillator 16, part of clock generator 9, acts as a timing generator. The output of clock generator 9 is applied to frequency divider 17. Frequency divider 17 provides its timing output signal to A/D converter 3.

Figure 4:
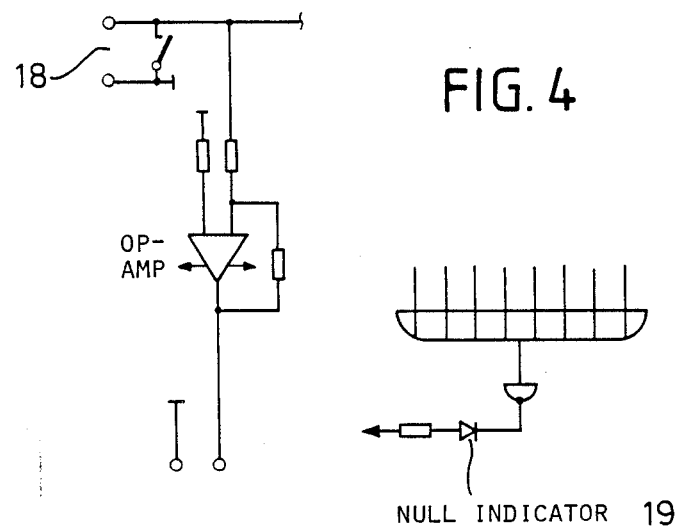
FIG. 4 shows a trimming circuit used in the present invention.
Figure 5:
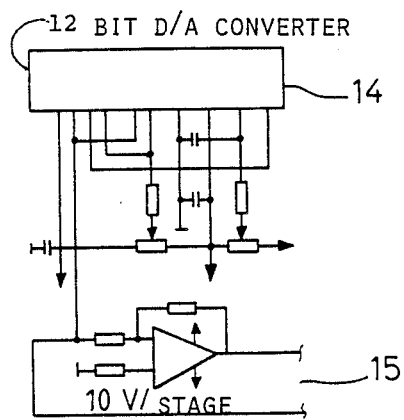
FIG. 5 shows a digital to analog circuit for providing an analog output signal in the present invention.

FIG. 4 shows how analog input 18 is connected to operational amplifier 2 and how operational amplifier 2 is coupled to null indicator 10, which has a light emitting diode (LED) 19 for indicating a zero setting. The LED can also serve as an operating indicator.

The operation of a preferred embodiment of the apparatus will now be described.

An analog input signal X, in this case generated by an angular velocity sensor, enters the apparatus through analog input unit 1. The signal is amplified and adjusted by operational amplifier 2 and then applied to A/D converter means 3, where it is converted to a binary number 12 bits in length. An 8 input OR gate followed by light emitting diode 19, together forming zero-bit indicator 10, facilitates the null adjustment of A/D converter 3. A constant reference voltage must be provided to A/D converter 3 if the converter is to provide accurate conversion.

The frequency of conversion is controlled by clock generator 9 and frequency divider 17/time reference 6. The clock generator provides a driver frequency of 3.2768 MHz from crystal 16. Divider 17 reduces this to 800 Hz. The 800 Hz signal is applied to A/D converter 3 to control the frequency of converter 3's sampling (in this embodiment, sampling occurs every 1.25 milliseconds). The 800 Hz signal is also applied to multiplier 4, giving an integration period of 1.25 milliseconds. The accuracy of the time signal is not as critical to the functioning of the apparatus as is the reference voltage.

The 12 bit word is then applied to multiplier module 4 in an "offset binary code" in order to achieve a polarity change which is necessary for the integration operation. The product register P is pre-loaded with the value 0 ($P(t_{0-1})=0$) for setting back and starting the integrator. When multiplier 4/summing means 5 is reset, the 27 outputs of product register P are loaded with 0 by pulldown resistors.

After processing through the multiplier 4/summing means 5, the lower 12 bits of the product register are suppressed for reasons of scaling. The resultant 12 bit output provides a resolution of ±2048 steps. This output range can be varied as desired by suitable scaling of either the Y value or the clock frequency. As the Y value and the value of the clock frequency can be entered as binary values, it is also possible to control the integration as a function of other input signals. This possibility has particular applications in adaptive control systems.

The 12 AND gates of stage 7 serve to match selectively the signal code before further processing occurs in stage 8. The signal code to be matched may be positive/negative logic, offset/true binary BCD.

As has been said, module 20 controls resetting the multiplier/summing means, null adjustment, switching and overflow. Also, if the integrated digital signal is to be processed further in the analog mode, it is converted in D/A converter 14 followed by an operational amplifier 15. This was done in the preferred embodiment for test purposes.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus for the conversion of an analog inertial velocity or acceleration signal to a digital signal and the processing of the resultant digital signal, comprising:
    input means responsive to sensor means, the sensor means detecting forces acting upon a seismic mass, the means responsive to the sensor means generating an analog signal proportional to velocity or acceleration of the mass;
    amplifier means for receiving said analog signal and amplifying said signal;
    analog to digital converter means coupled to the amplifier means for converting said amplified analog signal to a digital signal;
    integration means comprising multiplier means and summing means, said integration means forming a product P by multiplying the digital signal from the analog to digital converter means by a constant and adding the product of a previous multiplication operation, the forming operation continuing continuously over the integration period;
    clock means for providing an integration period and sampling period to the integration means and the analog to digital converter means, respectively, and coupled respectively to the integration means and the analog to digital converter means; and
    matching means for matching the digital format of product P to the digital format desired for the output.

2. The apparatus of claim 1, wherein the clock means comprises a frequency generator with a quartz oscillator and a frequency divider and the analog to digital converter means is coupled to a reference voltage means and the clock means.

3. The apparatus of claim 1, wherein the summing means contains a plurality of registers, allowing the sequential referencing of the bits of the product.

4. The apparatus of claim 3, wherein the multiplier means is loaded by means of pull-down resistors which resistors serve as a summing means and comprise a register.

5. The apparatus of claim 1, wherein the matching means contains a switch means which allows directing the product P to either further digital processing means or to a digital to analog converter means.

* * * * *